Figure 1:
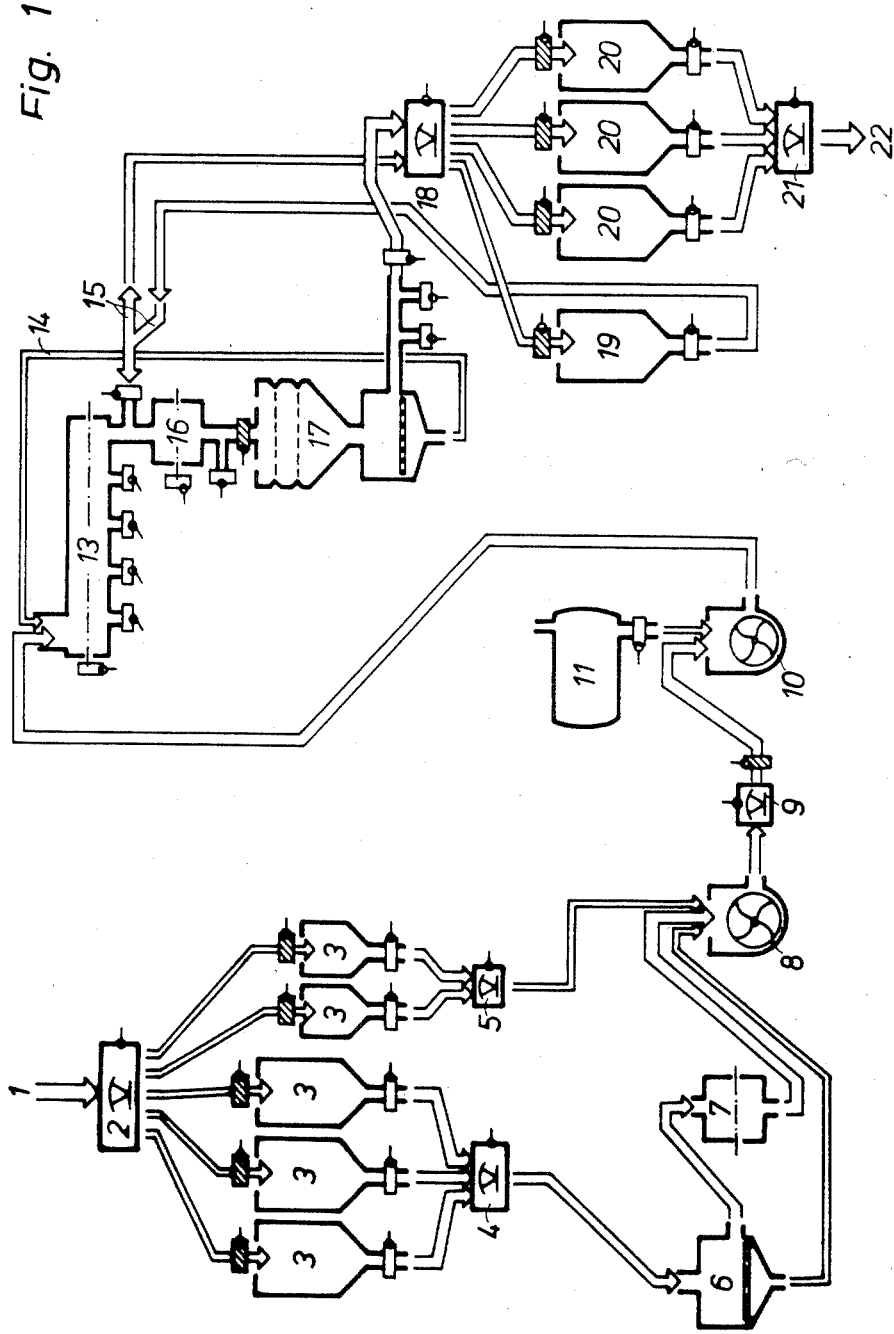

United States Patent [19]

Larsen

[11] Patent Number: 4,786,182
[45] Date of Patent: Nov. 22, 1988

[54] METHOD AND MEANS FOR CONTROLLING A FODDER MIXING PLANT

[76] Inventor: Ebbe B. Larsen, Slagkrogen 15, Odense Sφ, Denmark, 5220

[21] Appl. No.: 934,021

[22] Filed: Nov. 24, 1986

[30] Foreign Application Priority Data

Apr. 29, 1986 [DK] Denmark .................. 1967/86

[51] Int. Cl.$^4$ .............. B01F 15/04; A23L 1/00; G06F 15/46
[52] U.S. Cl. ............................ 366/140; 99/487; 364/468; 364/502; 366/141
[58] Field of Search ......... 364/502, 469, 148, 173, 364/468, 406; 366/140, 141; 99/486, 483, 487, 516; 426/516, 231, 285, 623, 454, 453

[56] References Cited

U.S. PATENT DOCUMENTS

| | | | |
|---|---|---|---|
| 3,181,482 | 5/1965 | Heth et al. | 99/487 X |
| 3,473,008 | 10/1969 | Bay et al. | 364/502 X |
| 3,932,736 | 1/1976 | Zarow et al. | 99/487 X |
| 4,171,164 | 10/1979 | Groves et al. | 426/231 X |
| 4,183,675 | 1/1980 | Zarow | 99/487 X |
| 4,340,937 | 7/1982 | Volk, Jr. | 364/468 |
| 4,463,430 | 7/1984 | Volk, Jr. et al. | 364/469 X |
| 4,588,091 | 5/1986 | Wade | 364/502 X |

FOREIGN PATENT DOCUMENTS 910614 11/1962 United Kingdom .......... 364/502

Primary Examiner—Harvey C. Hornsby
Assistant Examiner—Scott J. Haugland
Attorney, Agent, or Firm—Darby & Darby

[57] ABSTRACT

In order to produce pellets (22) in a pellet press following a recipe which is constantly being adjusted in order that the physical properties of the pellets are optimized in relation to the total production costs, a method is used where control is effected on the basis of a current sampling of the composition of the raw materials (28, 29) and of the pellets (37, 39), and on the basis of a current recording of the raw materials (30, 4, 5) and of the conditioning means (34, 38).

In order to ensure this control a coordinating computer unit (23) is used with subordinate computer units for raw material control (24, 25), economy control (42), pellet manufacturing (26) and stock control (27), which produce signals to the coordinating computer unit (23) in order that same may be adjusted (45, 48) on a constant basis, whereafter the pellets are manufactured.

10 Claims, 3 Drawing Sheets

METHOD AND MEANS FOR CONTROLLING A FODDER MIXING PLANT

The invention relates to a method for controlling a fodder mixing comprising raw material silos with mixers, conditioning sections, pellet presses, coolers and finished product silos.

Fodder mixing plants of this type are being increasingly used due to a demand for a rational and economically advantageous method for manufacturing fodder pellets.

Hitherto known plants are controlled either manually or by means of a more or less automatic adjustment of the actual pelleting which usually takes place in a machine with ring die.

Such an adjustment may take place on the basis of a measuring of pellets removed after having been pressed out, and by measuring the pellets removed after cooling and sifting in order thereby to establish the dust percentage. These measurements form the basis of the adjustment of those factors that influence the pellet and the pellet press, whether this be temperature, conditioning means and motor effect absorption.

These known adjustment plants are, however, not sufficient in order to achieve optimization of production since there is no possibility of allowing for changes in the composition of the raw materials, additives and the like before such are established by measuring of the pellets, and therefore this will involve a considerable delay and a consequent loss by the following adjustment.

It is the object of the invention to provide a method for controlling a plant with several production lines, where the pellets are manufactured on a current basis taking into account an overall evaluation of their quality, including their physical quality, and production cost.

This is achieved by a method where the controlling is effected on the basis of partly current sampling of the individual raw materials before and after mixing, of the pellets before and after the adding of e.g. water and/or fat, as well as sampling before supplying the pellets into the finished product silo, and partly a current recording of the individual raw materials as well as of the conditioning means before and after the pellet press.

By a completely new method there is hereby achieved a unique control and adjustment of a plant in that the controlling ensures that the pellets are produced according to a recipe in order that the physical quality, including their nutrient and water content, forms a decisive factor in the recipe together with the production costs of the manufacturing process. Hereby the recipe may be optimized in order that fodder pellets may be produced as economically as possible taking into account their quality.

By currently monitoring these factors, the recipe may constantly be optimized during production, which in turn ensures optimum pellet quality in relation to production costs.

By using a central computer receiving data from a number of subordinate computer units, it is possible to currently ensure a production which allows for changing circumstances, such as raw materials as well as costs.

Finally it is expedient that the central computer comprises steps for a current recipe adjustment of the preselected main recipe whereby pellets are produced of the highest possible quality in relation to the production costs.

Figure 2:
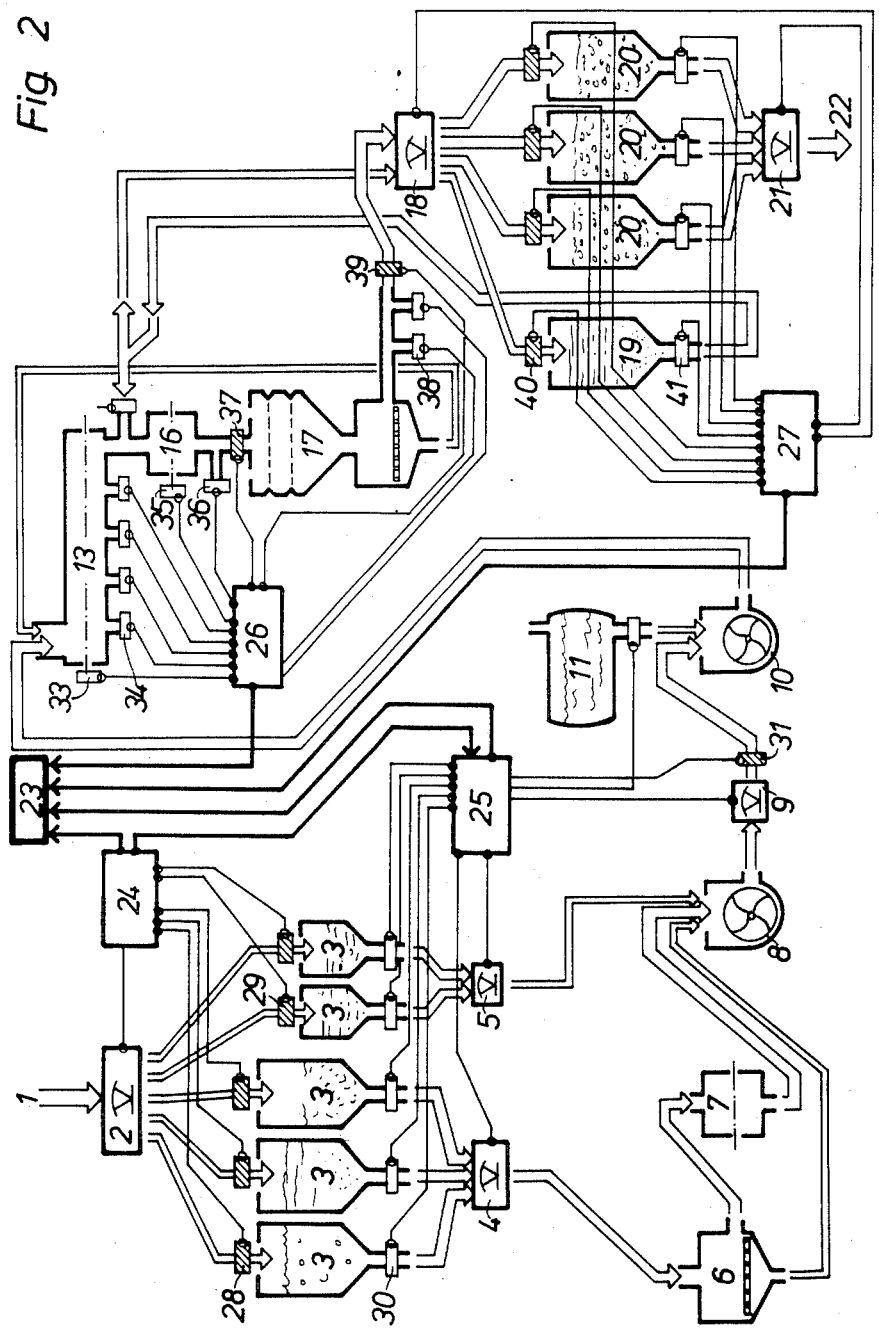
Figure 3:
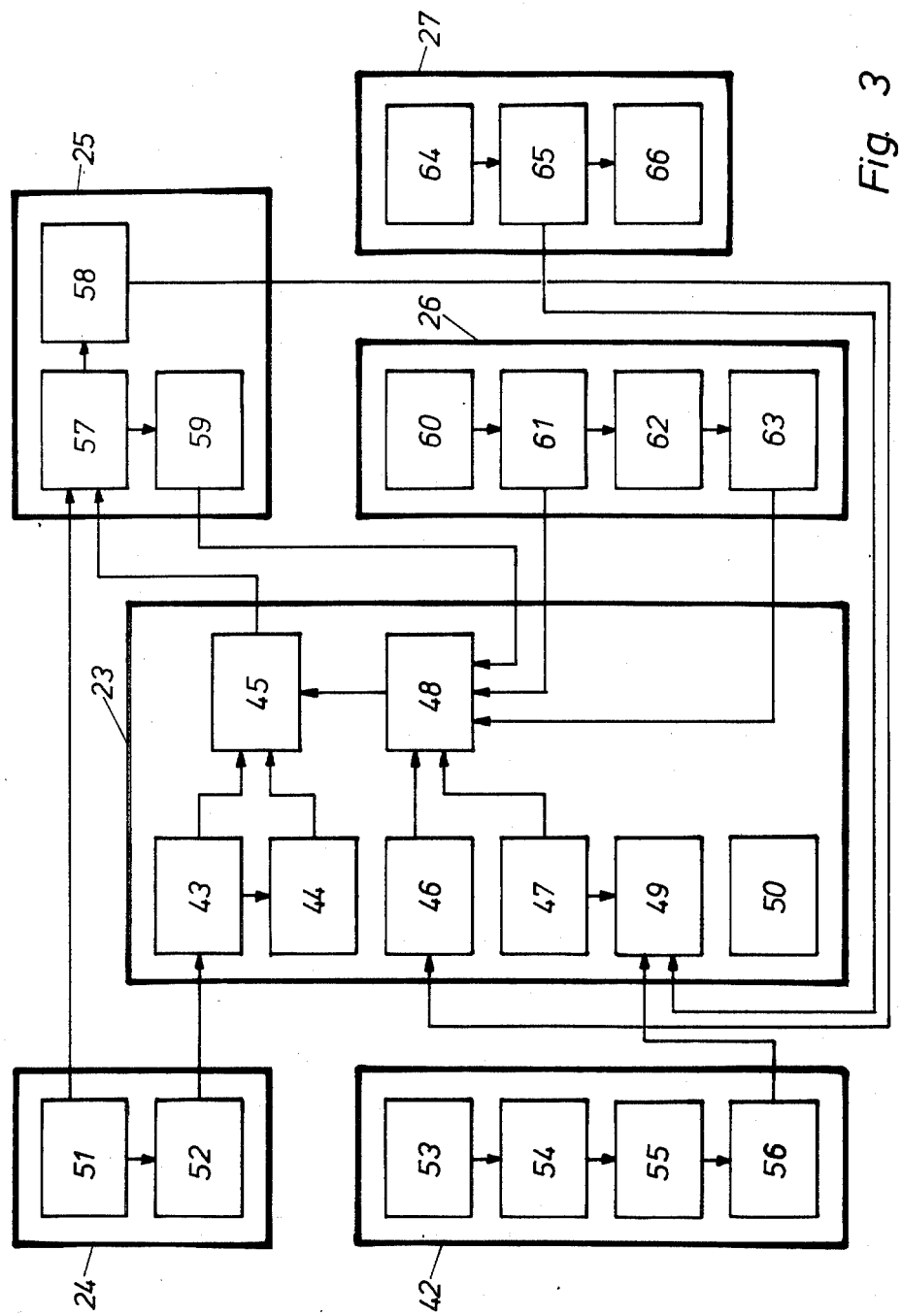

In the following the invention will be described in further detail with reference to the drawing, in which FIG. 1 shows a block diagram of a single press line in the plant from supply of raw materials to the discharging of the finished product, FIG. 2 shows a block diagram of the same press line showing the computers, and FIG. 3 shows a block diagram of the individual computers and their steps.

In FIG. 1 is shown an example of a fodder mixing plant where, however, only a single pellet press 16 is shown. It will be understood, however, that the method comprises control means for plants with any required number of pellet presses connected to the surrounding equipment, but the method is sufficiently clearly described on the basis of one single press 16.

The raw materials 1 are by way of a weighing device 2 supplied to the individual raw material silos 3 and may be of any organic or mineral sort.

The raw materials are discharged from the silos 3 and weighed by weighing devices 4 and 5 before they are delivered to a sieve 6 and mill or grinder 7 in order to end up in a mixer 8 to which may be added any required additives from the silos 3.

Via a weighing device 9 the material is carried to a further mixer 10 to which liquid may be added, such as water from a tank 11.

From here the mixture of raw materials is carried to a conditioning plant 13, in which binders, water or steam may be added before the mixture is supplied into the actual pellet press 16.

If no pills are to be produced in the plant, the raw material mixture may via a transport device 15 be carried to a silo 20, from which the raw material may be delivered.

After pressing in the press 16 the pellets are led through a cooler 17 and a sieve to a finishing device where water or fat can be added to the surface of the pellets. Then, via weighing station 18 they end up in their several finished product silos 20. There may be provided a further silo 19 for pellets that, if required, are to be returned to the pellet press 16.

In FIG. 2 is seen the same plant with a schematic view of the computers. These comprise a central computer 23, which coordinates and controls the whole plant.

The computer 23 is connected to computer units of which one 24 controls the raw material stock via a connection to the weighing device 2 and the sampling points 28 and 29 for raw materials to the individual silos 3.

Moreover, a computer 25 controls the batching of the raw materials via dosage elements 30 being connected with the weighing devices 4, 5 and 9 as well as with the sample point 31 for the mixture before adding water, if so required.

A computer unit 26 controls the pellet pressing by controlling the additives by means of valves 34 for the conditioning unit 13 with a motor 33 and a motor 35 and valve 36 as well as the sampling 37 of the pellets before cooling but after the dosage of fat and water has been sprayed onto the pellets on the die; afterwards any additives may further be added by a coating process.

Finally there is shown a computer unit 27 which controls the stock via the sampling 40, the dosage elements 41 and the weighing device 21.

All these computer units 24, 25, 26, 27 and a further computer unit 42 shown in FIG. 3 for recording the costs are connected to the central computer 23.

In FIG. 3 is shown in a schematic view the primary functions of the individual computer units and the connections between them.

The central computer 23 has the following steps and functions:
receives and stores analysis of the biological and physical characteristics 43 of the raw materials,
priority of the individual raw materials 44,
recipe print out for the cheapest possible pellets 45,
analysis of changes in the raw materials 46,
analysis of energy consumption 47,
current adjustment of recipe 48,
adjustment of operation costs in relation to pellet quality 49, and
adjustment of transport through the plant via sub computers 50.

The computer 24 has the following steps and functions:
adjustment of raw materials to the silo plant 51, and
sampling and quality control 52.

The computer 42 has the following steps and functions:
maintenance programs for the machine element 53,
recording of operation hours 54,
print out of maintenance order 55, and
summary of operation costs 56.

The computer 25 has the following steps and functions:
batching and mixing according to the recipe 57,
recording of raw material consumption 58, and
sampling and quality control 59.

The computer 26 has the following steps and functions:
technological optimization of the pellet manufacturing 60,
sampling and quality control 61,
finishing with water and/or fat 62, and
sampling and quality control 63.

Finally, the computer 27 has the following steps and functions:
adjustment of finished products in the silo plant 64,
sampling and quality control 65, and
batching for distribution 66.

The method will now be described in closer detail.

When the recipe is composed from the beginning and thus before test production, this happens on the basis of the amount of the various raw materials placed in the raw material silos 3 and the exact analysis of the nutritive content of these raw materials, in order that when the nutritive content of the recipe in the form of protein, fat, amino acid etc. is known, the central computer 23 can calculate the cheapest possible composition of the recipe taking into account only the biological values of the raw materials. However, it is in practice difficult to compose a recipe merely on the basis of the biological values in that it is necessary to take into consideration the influence of the raw materials on the physical characteristics of the pellets.

This means that in practice there are certain limits as to the possibilities of the computer for optimization in that for each raw material it is necessary to state a minimum and maximum amount with which they can be included in the recipe depending on their influence on the quality of the pellets.

In order to prevent that the pellet product becomes more expensive, each individual raw material has, apart from its biological values, been given order of priority 44 depending on its influence on the quality of the finished product.

When the recipe has thus been optimized with the limits transmitted from the central computer 23 to the batching computer 25, the individual raw materials can be batched via the various weighing devices 4, 5 and 9.

The weighed out amount is now carried forward for grinding and mixing, and from mixing to the actual pelleting plant which is controlled by the computer 26. This automatically controls the pelleting lines and optimizes the production thereof.

Concurrently with the production, a monitoring is made 61 of the physical quality of the pressed out pellets.

The result is recorded by the computer 26 in which is programmed the limits for the quality, as well as an upper and a lower control limit. At the same time the water content of the pellets is automatically measured 62.

If the test results is below or above the control limits, the computer 26 will automatically interfere in various ways. If the quality is for example too poor, the computer may try to adapt the production process technologically, in order that a better quality is achieved. This may be effected by reducing the production speed in order that a higher degree of fusion in the die is produced, or by changing the fat content in order that fat will automatically be removed from the raw material mixture which fat may in stead be applied 38 to the pellets.

The temperature of the raw material mixture, which is conditioned by steam 34, can moreover be changed in a downward direction in order that more friction in the die is achieved. Moreover, a binder 34 can be added immediately prior to the pressing, in order that the pellets become better. Finally, the press rolls in the die may be adjusted in order that a better quality or larger capacity is achieved.

Should none of these changes help, the computer 26 will be in direct contact with the central computer 23, which will now optimize a new recipe with raw materials which are more capable of being pressed and therefore provide a better quality.

Should the sampling of the pellets show that the quality is better than necessary, the only solution is either to increase production or to apply a cheaper recipe.

In almost all cases it will be economically expedient that the computer 26 informs the central computer 23 that the quality is better than necessary, and it will therefore optimize a new recipe which is cheaper than the one measured.

The central computer 23 will thus optimize a new recipe which will automatically be transferred to the batching computer 25 after an acceptance procedure, if so required.

The batching computer 25 now weight out a new recipe, and since the central computer 23 controls the transport to the presses, this will record when the new recipe composition reaches the presses, whereafter it automatically in the computer 26 will test the new recipe in comparison to the previous recipe and establish its position within the set limits, and it will if necessary repeat this procedure until optimization has taken place.

It is moreover possible to optimize via the water content of the recipe, which is measured 39 directly after the cooling process 17. The water content may form an ingredient in the economical optimization of the recipe just as the water may be taken into consideration when changing the quality on line with the other factors, such as energy consumption and temperature.

Measuring 59 of the nutritive content of the cooled pellets may likewise form part of the recipe optimization since the computer 26 transfers these data to the central computer 23 in order to obtain the most exact composition of the recipe. Apart from optimization of the production processes, the central computer 23 via the computer 27 includes control 64 of the stock in the finished product silos 19, 20, and control of the delivery 65 via a weighing out system 21.

In connection with this delivery of the finished product, data concerning the nutritive content may be collected from the computer 27 via a measuring instrument 41 in order that this may be compared with the guaranteed content, and these data can be transmitted via the computer 27 to the central computer 23, where they form part of the statistics and the quality control 65.

Also in connection with the weighing in of the raw materials to the raw material silo 3 control is exercised over the stock 64 via the computer 24, where the supplied raw material amount is recorded, and over the batching computer 25, where the consumed raw material amount is recorded.

Apart from optimization of the production processes the central computer 23 contains an information system, in which the energy consumption of the whole plant is controlled 47 just as the individual part processes are recorded.

Finally, a preventive maintenance program is incorporated in the central computer 23 via the computer 42, which controls hours of operation for each machine element 64 and prints out maintenance order 65 according to a predetermined program.

When any repair work is carried out, such work is inputted in the computer 42 in order to be recorded in the maintenance program and to form part of the economic calculations of production costs 56.

By this method the quality of the product forms a decisive parameter in connection with optimization of the recipe, just as water content and any nutritive content in the manufactured pellets are recorded and together with the production costs are entered as a parameter in the optimization of the recipe.

I claim:

1. A method for controlling a fodder mixing plant which produces fodder pellets according to a recipe, comprising the steps of:
   (a) delivering a plurality of separate raw materials to a mixing device at a production rate, at least some of said materials having nutrient content;
   (b) measuring the quantity and physical quality (including nutrient content) of each raw material as it is delivered to the mixing device;
   (c) mixing together the plurality of raw materials in the mixing device and drawing off the mixed raw materials at the production rate;
   (d) sampling and measuring the quantity and composition of the mixed raw material as it is drawn off;
   (e) controlling the quantity of each raw material delivered to the mixing device in accordance with the recipe, the measured quantities and qualities of raw material, and the quantity and composition of the mixed raw material;
   (f) conditioning the mixed raw material by mixing in additives, wherein the additives are selected from the group of binders, water or steam, and drawing off the conditioned materials at the production rate;
   (g) pelletizing the conditioned material to form pellets;
   (h) sampling and measuring the physical quality of the pellets, including the nutrient content and water content;
   (i) controlling the inclusion of additives and the production rate based on the measurement of physical quality in order to keep the fusion, nutrient content and water content in a range set by the recipe.

2. A method as claimed in claim 1 wherein the step of delivering a plurality of separate raw materials comprises the steps of:
   (a) conveying said individual raw materials to a plurality of individual raw material silos;
   (b) discharging from each of at least two raw material silos a predetermined quantity of raw material;
   (c) conveying the predetermined quantity of raw material from each of the least two silos to a weighing station;
   (d) conveying each of said weighed quantity of raw material to a sieve and separating it by size;
   (e) conveying said separated raw material to a grinder; and
   (f) conveying said ground raw material to a first mixer.

3. A method as claimed in claim 2 wherein the step of measuring the quantity of each raw material comprises the steps of:
   (a) weighing said individual raw materials as they are conveyed to the silos; and
   (b) weighing the predetermined quantity of raw material as they are conveyed from each of the at least two silos.

4. A method as claimed in claim 1 further including the steps of:
   (a) conveying said mixed raw materials to a second mixer and mixing said mixed raw materials with water; and
   (b) sampling of said water mixed raw materials as it leaves said second mixer.

5. A method according to claim 1 further including the steps of:
   (a) conveying said pelletized raw materials to a finishing device wherein a finish is applied to the surface of the pellets, said finish being selected from the group of water and fat;
   (b) sampling said finished pelletized raw materials;
   (c) measuring the weight and quality of the finished sample pellets; and
   (d) controlling said pelletizing in order to assure the production of pellets possessing a predetermined composition, moisture content and finish according to the recipe.

6. A method as claimed in claim 5 further including the step of conveying said finished and weighed pellets to at least one finished product silo.

7. A method as claimed in claim 1 further including the steps of:
   (a) recording each of the measured values; and (b) varying the recipe based on operation costs, including the energy consumption of the plant and the properties of the raw materials.

8. A method for controlling a fodder mixing plant according to a recipe comprising the steps of:
   (a) conveying a plurality of individual raw materials to a plurality of individual raw material silos;
   (b) weighing each of said individual raw materials as it is conveyed to the silos;
   (c) discharging from each of at least two raw material silos a predetermined quantity of raw material;
   (d) conveying the predetermined quantity of raw material from each of the at least two silos to a weighing station;
   (e) weighing the predetermined quantity of raw material from each of the at least two silos;
   (f) conveying each of said weighed predetermined quantity of raw material to and through a sieve;
   (g) conveying said sieved raw material to a grinder;
   (h) conveying said ground raw material to a first mixer;
   (i) conveying to a weighing station and weighing the mixed raw materials;
   (j) measuring the quality of each raw material and controlling the quantity of each raw material delivered to the mixing device in accordance with the recipe, the measured quantities and qualities of raw material, and the quantity and composition of the mixed raw material;
   (k) conveying said mixed raw materials to a second mixer and mixing said mixed raw materials with water;
   (l) conveying said water mixed raw materials to a conditioning plant and conditioning said materials by adding conditioning agents to the water mixed raw materials;
   (m) conveying said conditioned raw materials to a pellet press and pelletizing such material to form pellets;
   (n) conveying said pellets to a cooler and a second sieve;
   (o) sampling said pelletized raw materials as they are conveyed to the cooler and second sieve and measuring the physical quality of the pellets, including water content and nutrient content;
   (p) controlling the inclusion of additives and the production rate based on the measurement of physical quality in order to keep the fusion, nutrient content and water content in a range set by the recipe;
   (q) cooling said pellets and conveying said cooled pellets to a finishing device wherein a finish is applied to the surface of the pellets, said finish being selected from the group of water and fat;
   (r) sampling said finished pelletized raw materials;
   (s) conveying said finished pellets to a weighing station;
   (t) weighing and measuring the physical quality of said finished pellets;
   (u) controlling the application of said finish such that the finished pellet is finished according to the recipe;
   (v) conveying said finished and weighed pellets to at least one finished product silo.

9. Apparatus for producing fodder pellets according to a recipe, comprising:
   (a) sources of a plurality of raw materials, at least some of said raw materials having nutrient content;
   (b) a mixing device;
   (c) controllable delivery means for controlling the delivery of raw materials from said sources to said mixing device;
   (d) means for measuring the quantity of each raw material as it is delivered from said sources;
   (e) a plurality of first sampling and measuring means for sampling and measuring the quantity, composition, and quality, including nutritive content, of each raw material as it is delivered to said mixing device;
   (f) a plurality of second sampling and measuring means for measuring the quantity and composition of mixed raw materials as it is drawn off from the mixing means;
   (g) first controlling means for controlling the quantity of each raw material delivered to the mixing device in accordance with the recipe, the measured quantities and quality of raw material, and the quantity and composition of the mixed raw materials;
   (h) conditioning means for conditioning the mixed raw materials by mixing in additives, wherein the additives are selected from the group consisting of binders, water or steam, and drawing off the conditioned materials at the production rate;
   (i) pelletizing means for forming the conditioned material into pellets;
   (j) a plurality of third sampling and measuring means for sampling and measuring the physical quality of the pellets, including the nutritive content and water content; and
   (k) second controlling means for controlling the inclusion of additives and the production rate based on the measurement of physical quality in order to keep the fusion, nutrient content and water content in a range set by the recipe.

10. Apparatus as claimed in claim 9 further including a computer which directs the operation of the mixing device, the means for measuring the quantity of each raw material as it is delivered to said sources, the first sampling and measuring means, the second sampling and measuring means, the first controlling means, the conditioning means, the pelletizing means, the third sampling and measuring means, and the second controlling means.

* * * * *